(12) United States Patent
Barr

(10) Patent No.: US 7,611,440 B1
(45) Date of Patent: Nov. 3, 2009

(54) PROPULSION SYSTEM

(76) Inventor: Ronald A. Barr, 28607 Lancaster, Chesterfield Township, MI (US) 48047

(*) Notice: Subject to any disclaimer, the term of this patent is extended or adjusted under 35 U.S.C. 154(b) by 456 days.

(21) Appl. No.: 11/564,364

(22) Filed: Nov. 29, 2006

Related U.S. Application Data

(60) Provisional application No. 60/773,164, filed on Feb. 15, 2006.

(51) Int. Cl.
*B60K 1/02* (2006.01)
(52) U.S. Cl. .......... 477/3; 180/65.21; 701/22; 74/572.11
(58) Field of Classification Search .......... 477/3; 475/5; 74/572.1, 572.11, 572.12; 701/22; 180/65.21, 65.22, 65.26, 65.265, 65.285, 180/65.31; 360/125.43, 319
See application file for complete search history.

(56) References Cited

U.S. PATENT DOCUMENTS

| | | | |
|---|---|---|---|
| 6,043,577 A * | 3/2000 | Bornemann et al. | 310/74 |
| 6,044,922 A * | 4/2000 | Field | 180/65.23 |
| 6,401,012 B1 * | 6/2002 | Aoki et al. | 701/1 |
| 6,715,291 B1 * | 4/2004 | Liao | 60/698 |
| 7,174,806 B2 * | 2/2007 | Brackett et al. | 74/572.1 |
| 2006/0207811 A1 * | 9/2006 | Miyao | 180/65.2 |

* cited by examiner

*Primary Examiner*—David D. Le
(74) *Attorney, Agent, or Firm*—Christopher P. Maiorana, PC

(57) ABSTRACT

An apparatus comprising an engine, a drive shaft, a first electric motor, and a fly wheel assembly. The engine may be positioned in a vehicle. The drive shaft may be configured to rotate an axle. The first electric motor may be configured to rotated the drive shaft. The fly wheel assembly may be coupled to the engine and may be configured to drive the first electric motor based on data stored within the fly wheel assembly.

16 Claims, 5 Drawing Sheets though a vehicle communication bus. The control module 104 may instruct the second electric motor 116 to disengage when the vehicle decelerates below the predetermined speed.

PROPULSION SYSTEM

FIELD OF THE INVENTION

The present invention relates to an automotive drive system generally and, more particularly, to a propulsion system that may be used in an automotive application.

BACKGROUND OF THE INVENTION

Conventional vehicles include a fly wheel that is typically mounted to an engine. The fly wheel rotates in response to the rotation of the engine or crankshaft (i.e., the vehicle is in a rear or forward drive.) A drive shaft is not connected to the fly wheel. The drive shaft rotates in response to the fly wheel. The fly wheel adds rotational inertia to the system. The drive shaft rotates a drive axle (or rear axle). A pair of rear wheels are coupled to the drive axle.

Conventional fly wheels are purely mechanical components. It would be desirable to implement a fly wheel that provides information in an electronic medium related to various characteristics of the engine.

SUMMARY OF THE INVENTION

The present invention concerns an apparatus comprising an engine, a drive shaft, a first electric motor, and a fly wheel assembly. The engine may be positioned in a vehicle. The drive shaft may be configured to rotate an axle. The first electric motor may be configured to rotate the drive shaft. The fly wheel assembly may be coupled to the engine and may be configured to drive the first electric motor based on data stored within the fly wheel assembly.

The objects, features and advantages of the present invention include providing a propulsion system that may (i) reduce gas consumption (ii) be easily implemented on a vehicle that uses a fly wheel (iii) be used in land or sea vehicles and/or (iv) be inexpensive to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
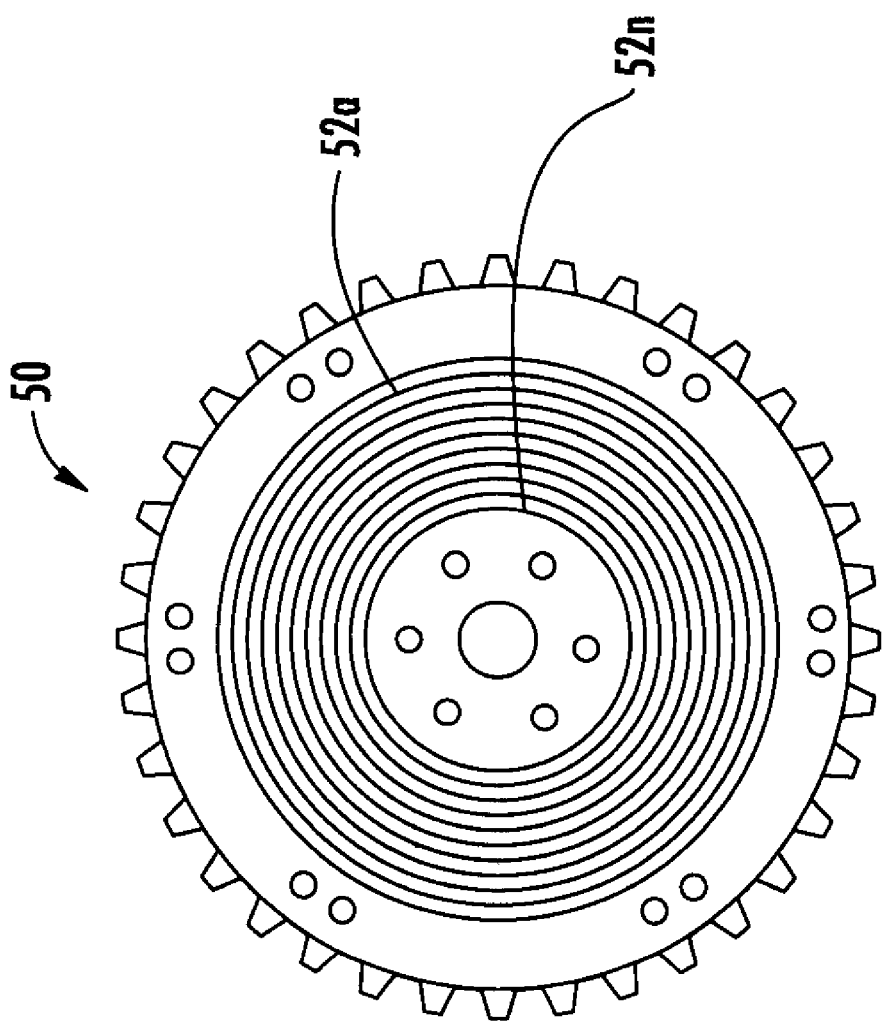
FIG. 1 is a diagram of a an embodiment of the present invention.

Referring to FIG. 1, a diagram of a fly wheel 50 is shown in accordance with a preferred embodiment of the present invention. The fly wheel 50 may be referred to as a fly wheel compact disc. The fly wheel 50 generally comprises a plurality of disc tracks 52a-52n. The disc tracks 52a-52n may be implemented to include data. Such data may correspond to various vehicle characteristics such as engine speed (RPM), transmission status, vehicle speed, etc.

The disc tracks 52a-52n may be formed on a first side of the fly wheel 50. The particular type of data stored on the disc tracks 52a-52n may be varied to meet the design criteria of a particular implementation. In general, one side of the fly wheel 50 may be coupled to the engine. The side of the fly wheel 50 that includes the disc tracks 52a-52n may be positioned to face away from the engine.

The tracks 52a-52n may comprise a plurality of grooves and/or pits which correspond to data. The particular type of data coding used (e.g., CD, DVD, etc.) may be varied to meet the design criteria of a particular implementation. In one example, the disc tracks 52a-52n may be machined directly onto the surface (e.g., one of the sides) of the fly wheel 50. In such an arrangement, the disc tracks 52a-52n may include information related to various vehicle characteristics. In another example, a fully-assembled and pre-programmed disc may be coupled directly to the surface of the fly wheel 50. The size and shape of the fly wheel 50 may be varied to meet the design criteria of the particular implementation.

Figure 2:
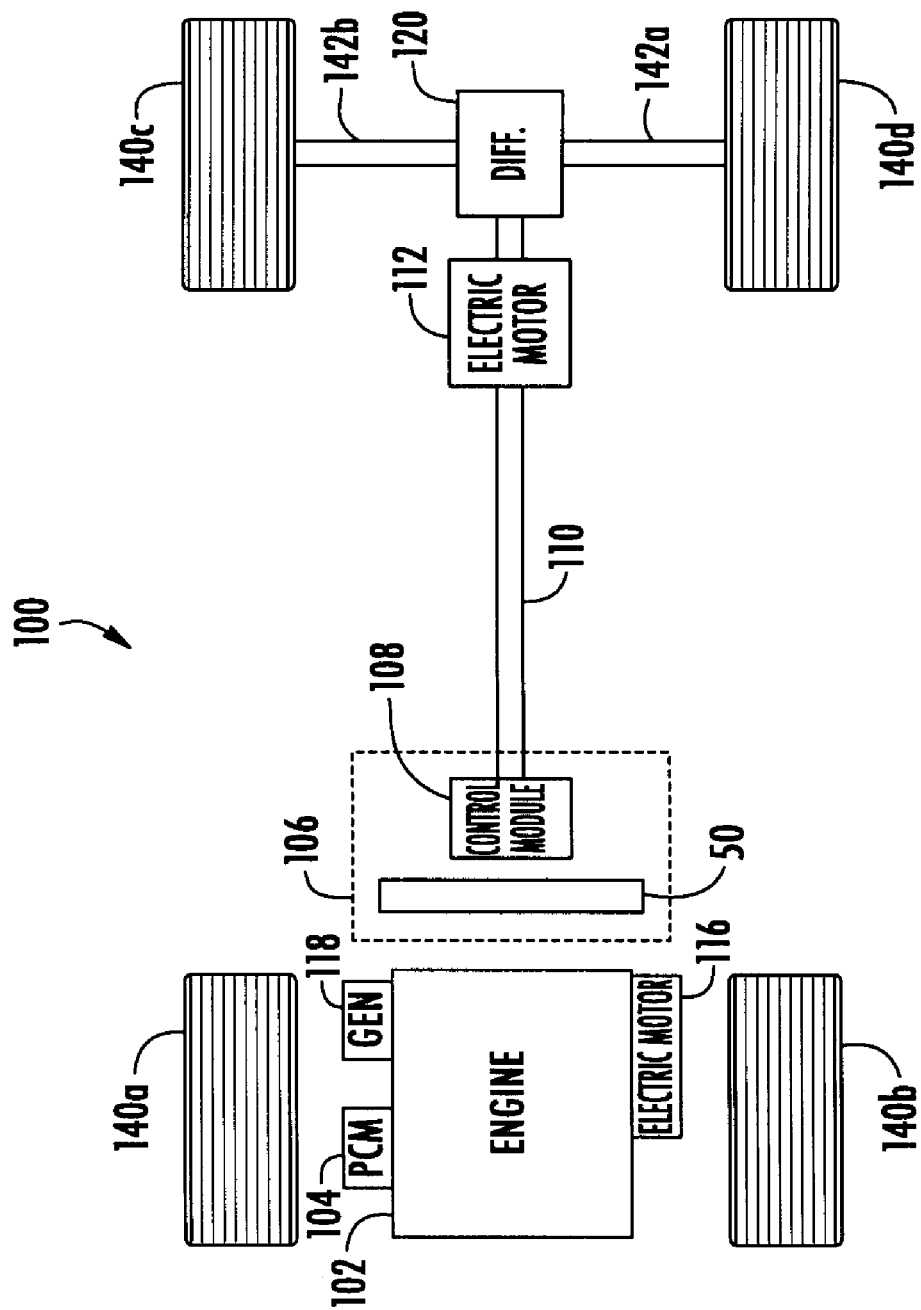
FIG. 2 is a diagram of a system in accordance with the present invention.

Referring to FIG. 2, a block diagram of a system 100 is shown in accordance with an embodiment of the present invention. The system 100 may include various portions of a powertrain, transmission, and chassis section of a vehicle. The system 100 includes an engine 102, a module 104, an assembly 106, rear axle 142, and wheels 140a-140d. The module 104 may be implemented as a powertrain control module. The assembly 106 may be implemented as a fly wheel assembly. The powertrain control module 104 may be positioned near the engine 102 and may be used to control various engine related functions. The electronic fly wheel assembly 106 may be mounted to the engine 102 (or crankshaft).

The fly wheel assembly 106 generally comprises the electronic fly wheel 50 and a control module 108. The fly wheel 50 may be coupled directly to the engine 102. The fly wheel 50 may rotate in response to the rotation of the engine 102. The rotation of the fly wheel 50 may correspond to the speed of the engine (RPM). The control module 108 may include a number of controllers and optical assembly (not shown). The optical assembly may read the data from the disc tracks 52a-52n of the fly wheel 50. An electric motor 112 may receive a control signal from the control module 108 via a wire harness (not shown). The wire harness may include a plurality of wires configured to transmit data and/or power signals to the electric motor 112.

The electric motor 112 may rotate the drive shaft 110 in response to receiving the control signal from the control module 108. The electric motor 112 may rotate the drive shaft 110 based on the engine speed as detected the fly wheel assembly 106. The drive shaft 110 may engage a differential 120 for rotating a rear axle 142a and 142b, which in turn rotate a wheel 140c and a wheel 140d.

In operation, the system 100 may allow the engine 102 to provide energy needed to begin moving the vehicle up to a predetermined speed. At such a point, the engine 102 may cut off and an electric motor 116 may be used to rotate the fly wheel 50. The rotation of the fly wheel 50 may simulate the rotation of the engine 102. In one example, the control module 104 may present a control signal to the second electric motor 116 when the control module 104 has detected that the vehicle has attained the pre-determined vehicle speed. In one example, the control module 104 may be coupled to one or more speed sensors to determine the vehicle speed. In another example, the control module 104 may receive vehicle speed information from a transmission controller (not shown) or an anti-locking braking system (ABS) controller (not shown) via (i) a hardwired signal or (ii) multiplexed data signal over a data bus. When the control module 104 determines that the vehicle has reached the predetermined speed, the control module 104 may turn off (or cut off) the engine 102 and activate the electric motor 116. The control module 104 may control the electric motor 116 in response to the driver adjusting throttle control over the vehicle.

When the vehicle is in the state in which the engine is cut off and the electric motor 116 is controlling the rotation of the fly wheel 50, a laser (to be described in more detail in connection with FIG. 4) in the control module 108 may point to a particular one of the disc tracks 52*a*-52*n* on the fly wheel 50. A particular one of the tracks 52*a*-52*n* may present information related to engine speed based on the rotation of the fly wheel 50. A laser may interpret the data on a particular one of the tracks 52*a*-52*n* and issue a control signal (via the control module 108) to the electric motor 112. The electric motor 112 may rotate the drive shaft 110 in response to the control signal. In turn, the vehicle may maintain a current speed or may increase/decrease the speed while the engine 102 is not running. The data stored on the fly wheel 50 may allow the vehicle to operate with reduced gas consumption since 102 the engine is not running as often.

A generator 118 may be incorporated into the system 100 to provide additional power for the electric motor 112 and/or the electric motor 116. In another example, separate batteries may be implemented to provide power for the electric motor 112 and the electric motor 116. In general, the electric motor 116 may be used to rotate the flywheel and may consume a modest amount of power since the fly wheel 50 is not connected (e.g., the fly wheel 50 is dis-engaged) to the engine 102. The first electric motor 112 may be implemented as a low torque motor. The control module 108 may also automatically start the engine 102 and detect that the vehicle is below the predetermined speed. In such a state, the fly wheel 50 may be engaged with the engine 102 and may rotate with the engine. The control module 104 may notify the control module 108 when the vehicle is traveling at a speed below the predetermined speed. The control module 104 may disable the electric motor 116 when the vehicle is traveling below the predetermined speed. In addition, the control module 108 may disable the electric motor 112 in such a state. The electric motor 112 may discontinue rotating the drive shaft 110. The drive shaft 110 may rotate in response to the rotation of the fly wheel 50 without any electronic control via the electric motor 112 when the vehicle is below the predetermined speed (e.g., the drive shaft 110 may rotate based on the rotation of the engine 102 while running).

The type of data stored on the fly wheel 50 may also include transmission status and/or vehicle speed. The particular type of data stored or provided by the fly wheel 50 may be varied to meet the design criteria of a particular implementation. Data which represents vehicle speed and transmission states may be stored on separate tracks on the fly wheel 50. The electric motor 116 may control the rotation of the fly wheel 50 when the vehicle has reached the predetermined speed regardless of whether the vehicle is in a reverse or a forward drive. The electronic fly wheel assembly 104 may be packaged such that the fly wheel 50 and the control module 108 are free from the invasion of elements (e.g., environmental and/or thermal) which may degrade performance. The electronic fly wheel assembly 104 may be configured to operate in higher temperature zones. The fly wheel assembly 104 may be packaged within a housing (not shown) to ensure that the fly wheel 50, the disc tracks 52*a*-52*n* and the control module 108 remain free from contaminants.

The control module 108 may allow a smooth transition when the vehicle transitions between control from the engine 102 to control from the fly wheel 50 (or vice versa). Such a transition from the engine 102 rotating the fly wheel 50 to the electric motor 116 rotating the fly wheel 50 may not be noticed by the driver once the vehicle achieves and exceeds the predetermined vehicle speed. The control module 108 may include various software strategies which may minimize any negative effects (e.g., knocks and/or stalls) encountered during the transition from the engine 102 rotating fly wheel 50 to the electric motor 116 rotating the fly wheel 50.

In general, prior to the engine 102 reaching the predetermined speed, the engine 102 may operate from a front axle (not shown) at slower speeds to drive a wheel 140*a* and a wheel 140*d*. Once the demand for higher speed is needed (e.g., travel on expressway), the rear axle could be driven by the drive shaft 110 under the control of the fly wheel 50 which is configured to simulate engine speed. The present invention may also be applied to boats or any such devices used for transportation that run from an engine and use a fly wheel.

Figure 3:
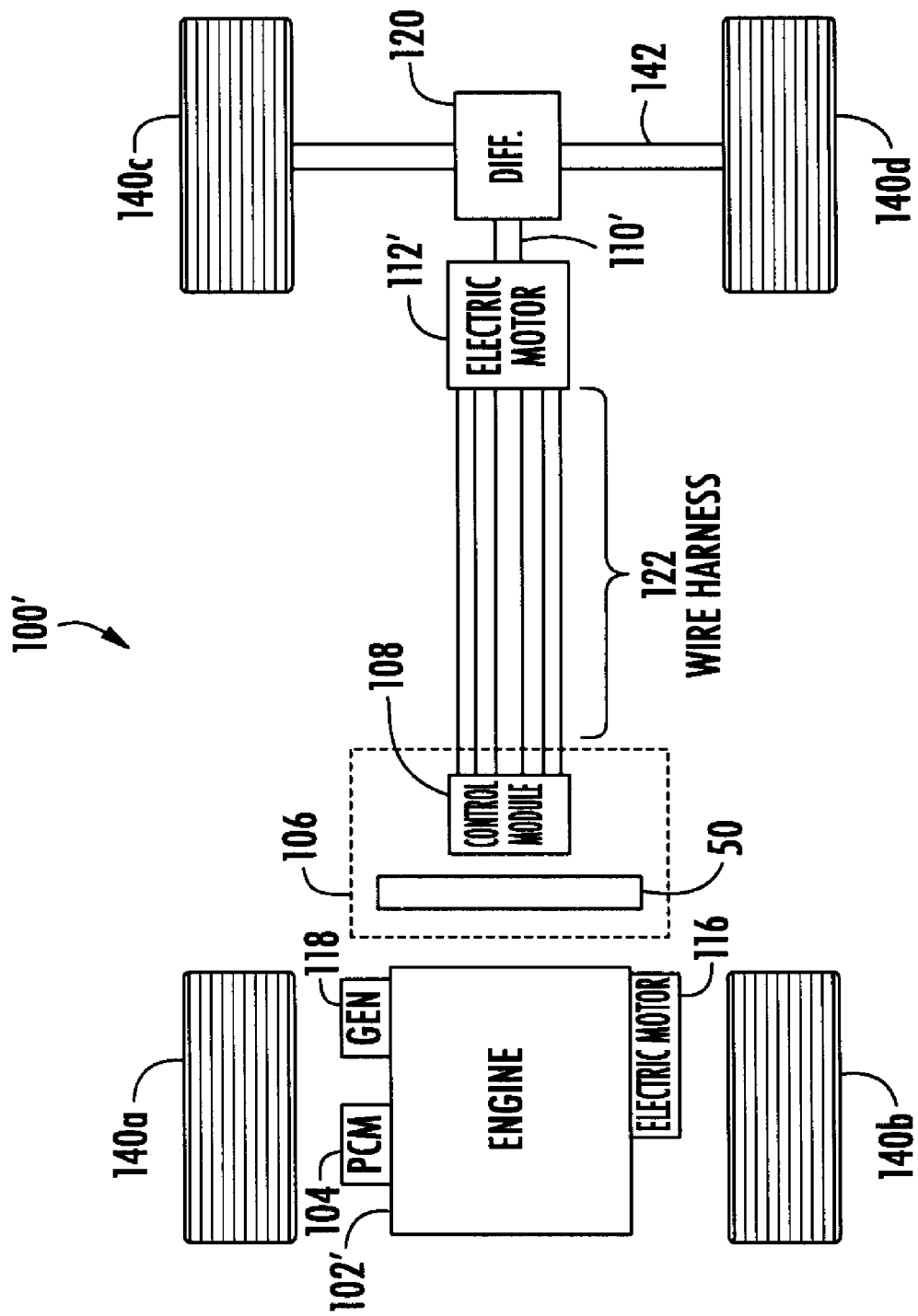
FIG. 3 is a diagram of a system in accordance to an alternate embodiment of the present invention.

Referring to FIG. 3, a block diagram of a system 100' is shown in accordance with an alternate embodiment of the present invention. In operation, the fly wheel 50 may provide information related to engine speed when the vehicle is in a forward or a reverse drive. The fly wheel 50 may present such information regardless of whether the vehicle attains a predetermined vehicle speed. The engine 102' may not be used to rotate the fly wheel 50 and in turn drive the vehicle. The vehicle may drive solely based on the information provided by the fly wheel 50. In one example, the electric motor 116 may drive (or rotate) the fly wheel 50 in response to the control signal issued by the control module 104. In one implementation, the engine 102' may be smaller in size than the engine 102 as shown in connection with FIG. 1. The engine 102' may be used to power the generator 118. The electric motor 116 may need more power in order to rotate the fly wheel 50 under forward and/or reverse drive conditions. The system 100' may also use a regenerative braking system (not shown) in order to provide additional power for the system 100'. If needed, additional batteries may be added to the system 100' to ensure a sufficient power supply. The control module 104 may provide vehicle throttle information to the electric motor 116. The electric motor 116 may adjust the rotation of the fly wheel 50 (or vary engine speed) according to the appropriate throttle control input by the driver.

A wire harness 122 may present control signals and data signals from the control module 108 to the electric motor 112'. The wire harness 122 may include light gauge wires to carry data signals and heavier gauge wires to carry power. The heavier gauge wires may be sufficient to carry current to drive the electric motor 112'. The control module 108 may present the data over the wire harness 122 to the electric motor 112'. The electric motor 112' may rotate the drive shaft 110' in response to the data. The electric motor 112' may be coupled to the generator 118 to ensure that enough power is provided to drive the drive shaft 110'. The differential 120 may respond to the drive shaft 110' and allow the rear axle to rotate. In general, the electric motor 112 may be implemented as a high torque motor.

The drive shaft 110' may be shorter in length than the drive shaft 110 as shown in connection with FIG. 1. The system 100' may not need a transmission since the fly wheel 50 may present transmission status to the electric motor 112'. The electric motor 112' may need additional circuitry (e.g., processors) to interpret the transmission status and control the rotation of the drive shaft 110' according to the desired drive status (e.g., forward or reverse). In addition, the control module 108 may present vehicle speed information (as read from of the fly wheel 50) to the electric motor 112'. The electric motor 112' may rotate the drive shaft 110 in response to either vehicle speed information or the engine RPM stored on the fly wheel 50.

The differential 120 may be implemented as a differential with torque converter support. The differential 120 may include a first torque convertor coupled to one side of the rear axle and a second torque convertor coupled to the other side of the rear axle. Each torque convertor may include a turbine, pump and stator. Each torque converter may also include a drive gear having angled teeth positioned on a first side. The torque converters, when positioned on the rear axle 110', may be configured such that the drive gears of the respective torque converters face each other. A gap may be formed between the drive gears to allow the angled teeth of the drive gears to engage a pinion. The pinion may also include angled teeth for engaging the angled teeth of the drive gears. The torque converters as positioned on the rear axle may be axially spaced and aligned with each other such that when the pinion rotates, each torque converter may rotate at the same time and with the same rotational velocity. An end positioned opposite to the angled teeth of the pinion may be coupled to the end of the drive shaft 110'. In response to the drive shaft 110' rotating, the pinion rotates each torque converter forcing the rear axle rotate. The differential 120 may still allow the left axle and the right axle to move at different speeds. Rotation of the drive shaft 110' with rotation of the torque converters may turn the rear axle at higher speeds. The torque converters may develop torque power which may assist in rotating the axle. Such torque power may create less demand for fuel.

Figure 4:
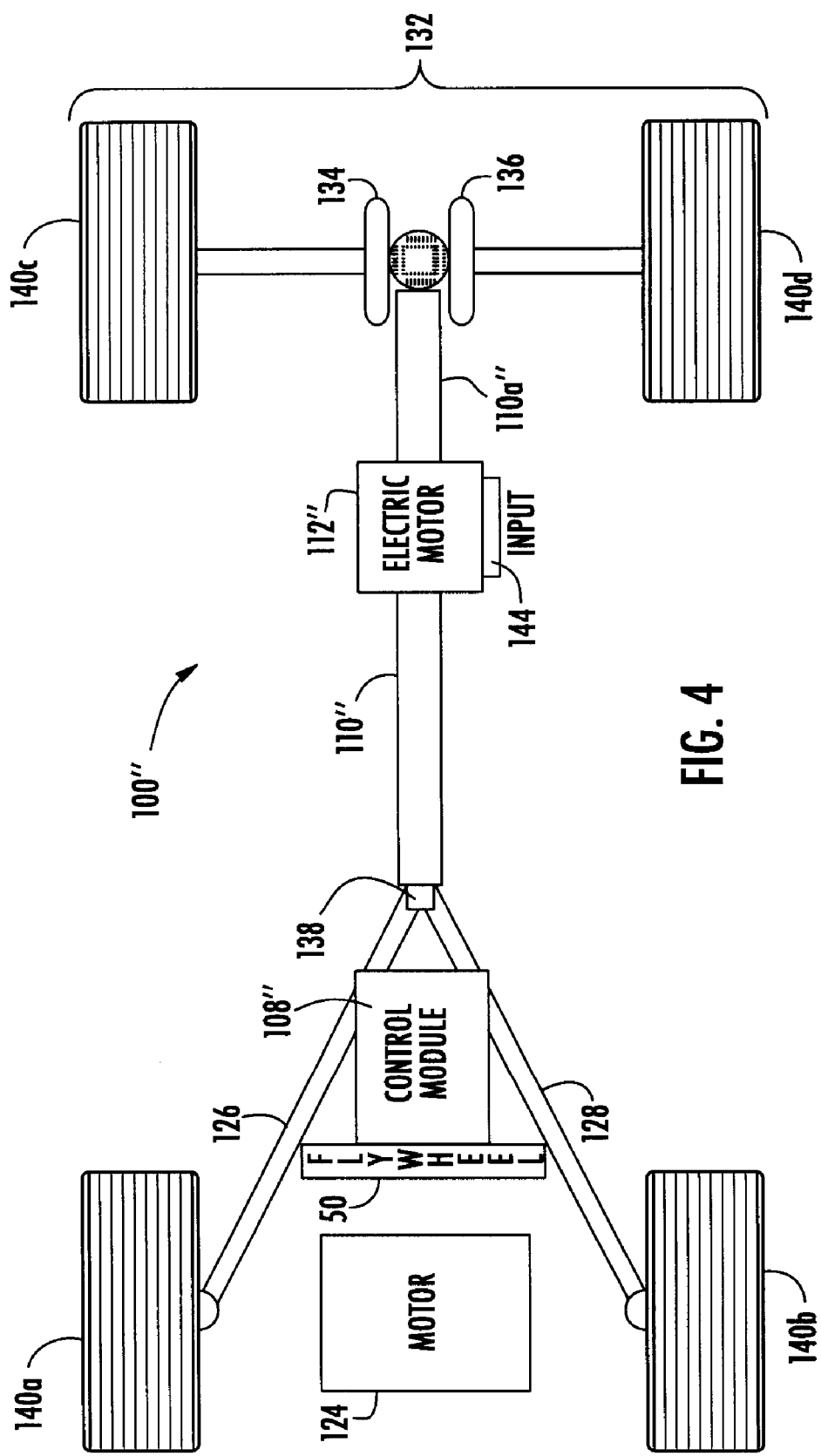
FIG. 4 is a diagram of another alternate embodiment of the present invention.

Referring to FIG. 4, a block diagram of a system 100" is shown in accordance with an alternate embodiment of the present invention. The system 100" includes a motor 124, an electric motor 112", a converter 134, a converter 136, a rear drive assembly 132, an input 144, and a torque convertor 138. The electric motor 112" is connected to the control module 108 via a wire harness (not shown). A first differential shaft 126 and a second differential shaft 128 may be the same size or different sizes. The differential 126 and the differential 128 may still allow the wheel 140a and the wheel 140b to move at different speeds. A drive shaft 110" and a drive shaft 110a" may have the same length and width, or different lengths and widths. The electric motor 112 may be flexibly positioned by adjusting the length of the drive shaft 110' and the drive shaft 110a". Such flexible positioning may allow a designer to distribute the weight of the electric motor 112' appropriately.

In operation, the fly wheel 50 may provide information related to engine speed when the vehicle is in a forward or reverse drive. The fly wheel 50 may present such information regardless of whether the vehicle attains a predetermined speed. A small motor 124 may be used to maintain operation of electric motor 112" and to recharge the battery (not shown) using only a minimal amount of power. The motor 124 may be smaller in size than the engine 102 shown in connection with FIG. 1 and the engine 102" shown in connection with FIG. 2.

In addition, the control module 108 may present vehicle speed information (as read from the fly wheel 50) to the electric motor 112". The electric motor 112" may rotate the drive shaft 110" in response to either vehicle speed information or the engine RPM stored on the flywheel 50.

Figure 5:
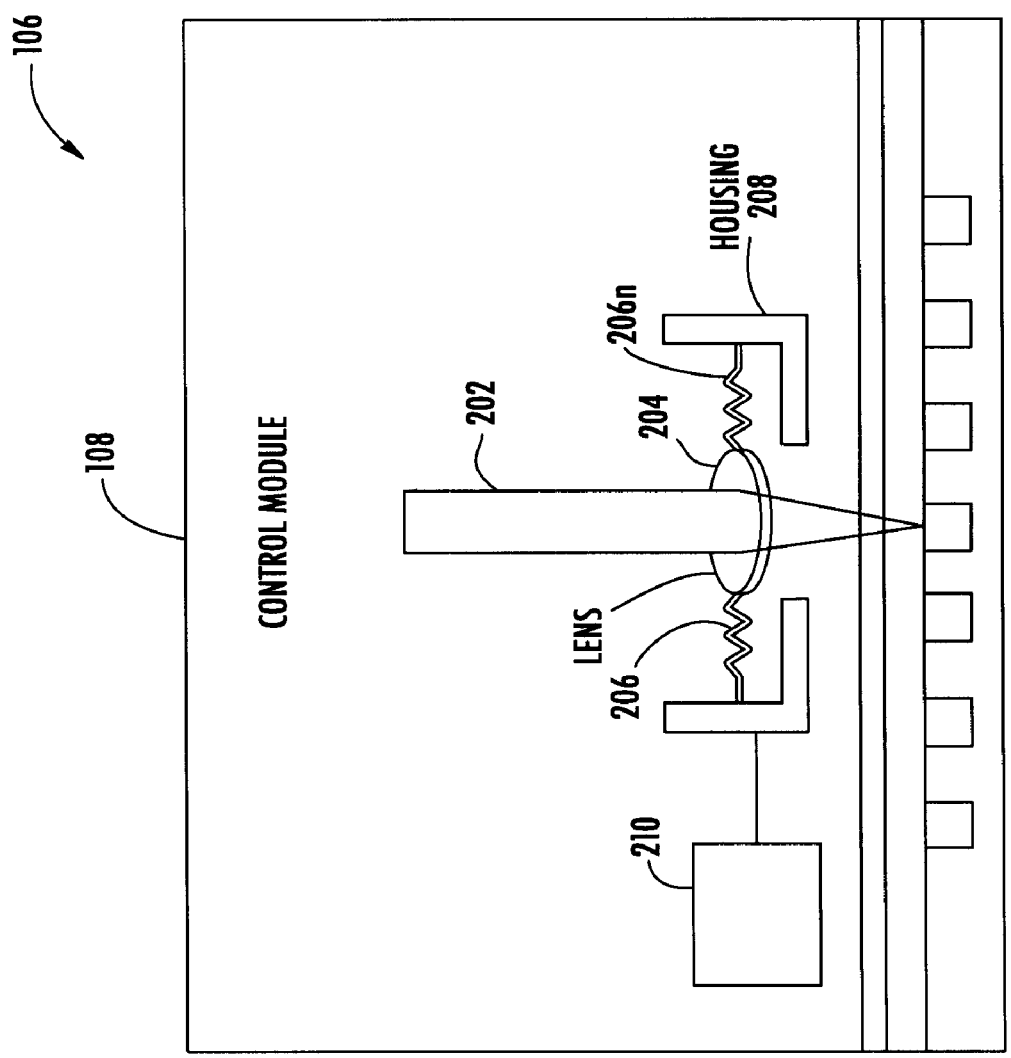
FIG. 5 is a more detailed diagram of the data control module.

Referring to FIG. 5, a more detailed diagram of the control module 108 is shown. The control module 108 may emit a laser beam 202. The control module 108 may pass the laser beam 202 through a lens 204. The lens 204 may be coupled to springs 206a-206n. A housing 208 may support the springs 206a-206n and the lens 204. The control module 108 may include a stepper motor 210. The stepper motor 210 may move the housing horizontally in response to a controller (not shown). The controller may be included in the control module 108. The laser beam 202 may be passed through the lens 204 and emitted on any one of a particular number of the disc tracks 52a-52n. A signal may be picked up by the control module 108 from a particular area of the disc tracks 52a-52n when the laser beam 202 is positioned on of the disc track. The signal picked up by the control module 108 may be representative of the type of data stored on any one of the disc tracks 52a-52n. The disc tracks 52a-52n may be configured to receive and store data on vehicle performance to be reviewed at any time with computer technology used today.

While the invention has been particularly shown and described with reference to the preferred embodiments thereof, it will be understood by those skilled in the art that various changes in form and details may be made without departing from the scope of the invention.

The invention claimed is:

1. An apparatus comprising:
an engine positioned in a vehicle;
a drive shaft configured to rotate an axle;
a first electric motor configured to rotate said drive shaft; and
a fly wheel assembly coupled to said engine and configured to drive said first electric motor based on data stored within said fly wheel assembly, wherein said fly wheel assembly includes (i) a fly wheel configured to provide data storage capability and (ii) a control module configured to (a) read said data from of said fly wheel and (b) present a control signal to said first electric motor in response to said data, wherein a first side of said fly wheel includes an optical disc having a plurality of disc tracks.

2. The apparatus according to claim 1, wherein said fly wheel assembly controls the rotation of said drive shaft via said first electric motor when said vehicle reaches a predetermined speed.

3. The apparatus according to claim 1, wherein said fly wheel includes a plurality of disc tracks configured to store and present said data.

4. The apparatus according to claim 1, wherein said data comprises information related to vehicle speed, performance, engine speed, and transmission status.

5. The apparatus according to claim 1, wherein said data can be reviewed at any time with a computer.

6. The apparatus according to claim 1, wherein said fly wheel further comprises a second side, wherein (i) said first side is configured to provide said data storage capability and (ii) said second side is coupled to said first electric motor.

7. The apparatus according to claim 6, wherein a pre-assembled optical disc is coupled to said first side of said fly wheel.

8. The apparatus according to claim 6, wherein said first side defines a plurality of pits and grooves to form a compact disc.

9. The apparatus according to claim 8, wherein said plurality of pits and grooves are machined directly onto said first side of said fly wheel.

10. The apparatus according to claim 1, further comprising:
a powertrain control module;
a second electric motor positioned about said engine and configured to rotate said fly wheel; and a generator configured to provide power for said second electric motor.

11. The apparatus according to claim 10, wherein said engine turns off in response to said vehicle reaching a predetermined speed and said second electric motor rotates said fly wheel in response to a control signal being presented by said powertrain control module.

12. An apparatus comprising:
a drive shaft configured to rotate an axle;
a first electric motor configured to rotate said drive shaft; and
a fly wheel assembly coupled to an engine and configured to drive said first electric motor in response to data being stored within said fly wheel assembly, wherein said fly wheel assembly includes (i) a fly wheel configured to provide data storage capability and (ii) a control module configured to (a) read said data from of said fly wheel and (b) present a first control signal to said first electric motor in response to said data, wherein a first side of said fly wheel includes an optical disc having a plurality of disc tracks.

13. The apparatus according to claim 12, wherein said fly wheel assembly controls the rotation of said drive shaft via said electric motor when a vehicle is in a forward or reverse drive.

14. The apparatus according to claim 12, further comprising:
a powertrain control module configured to generate a second control signal;
a second electric motor configured to rotate said fly wheel in response to said second control signal; and
a generator configured to provide power for said second electric motor.

15. The apparatus according to claim 12, wherein said data provides information related to vehicle speed, performance, engine speed and transmission status.

16. An apparatus comprising:
an engine positioned in a vehicle;
a drive shaft configured to rotate an axle;
a first electric motor configured to rotate said drive shaft; and
a fly wheel assembly coupled to said engine and configured to drive said first electric motor based on data stored within said fly wheel assembly, wherein (i) said fly wheel comprises (a) a first side configured to provide said data storage capability and (b) a second side coupled to a motor and (ii) a pre-assembled optical disc is coupled to said first side of said fly wheel.

* * * * *